United States Patent

Göransson-Dahlander et al.

[11] 3,903,164
[45] Sept. 2, 1975

[54] PHARMACODYNAMICALLY ACTIVE AMINO ALKYLOXIM ETHERS

[75] Inventors: Barbro Karin Göransson-Dahlander, Farsta; Nils Ake Jönsson, Sodertalje; Ferenc Merényi, Taby, all of Sweden

[73] Assignee: AB Kabi, Stockholm, Sweden

[22] Filed: Mar. 20, 1973

[21] Appl. No.: 343,130

[30] Foreign Application Priority Data
Mar. 24, 1972 Sweden.............................. 3904/72

[52] U.S. Cl.................260/566 AE; 260/247.5 R; 260/293.66; 260/326.85; 260/566 A; 424/248; 424/267; 424/274; 424/327
[51] Int. Cl.².......................................... C07C 131/08
[58] Field of Search............................ 260/566 AE

[56] References Cited
UNITED STATES PATENTS
3,526,671  9/1970  Judd.............................. 260/566 AE
3,692,835  9/1972  Van Dijk et al.............. 260/566 AE OTHER PUBLICATIONS
Chemical Abstracts, vol. 70, column 68000(a) (1969).
Chemical Abstracts, vol. 52, column 10909(f), 10911(i).

*Primary Examiner*—Gerald A. Schwartz
*Attorney, Agent, or Firm*—Brumbaugh, Graves, Donohue & Raymond

[57] ABSTRACT

Pharmacodynamically active amino alkyloxim ethers of the general formula

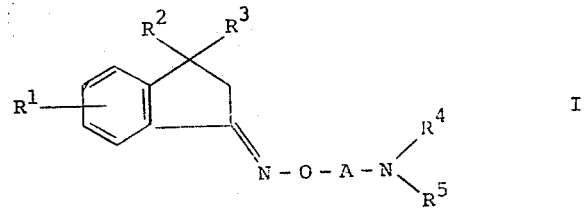

wherein $R^1$ signifies hydrogen, halogen, alkoxy radicals containing 1–3 carbon atoms or nitro groups, $R^2$ and $R^3$ signify alkyl radicals containing 1–3 carbon atoms which taken together with the carbon atom I in the indan ring can form a ring, A signifies a possibly lower alkyl substituted ethylene or trimethylene group and $R^4$ and $R^5$ individually signify hydrogen or alkyl radicals containing 1–4 carbon atoms or together with the amine nitrogen form a heterocyclic ring, which in addition to the amine nitrogen may contain an oxygen atom or a possibly lower alkylated imino group, and the corresponding amine oxides, quarternary ammonium compounds and salts with physiologically acceptable acids. Pharmaceutical compositions containing such compounds and a method for treating psychiatric and psychosomatic diseases applying the same.

9 Claims, No Drawings

PHARMACODYNAMICALLY ACTIVE AMINO ALKYLOXIM ETHERS

The present invention relates to new pharmacodynamically active amino alkyloxim ethers of 1,1-disubstituted indan-3-one-oximes of the general formula

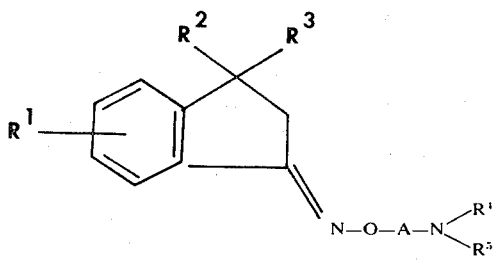

as well as the corresponding amineoxides, quarternary ammonium-compounds and salts with physiologically acceptable acids. In formula I $R^1$ signifies hydrogen, halogen, alkoxy radicals containing 1–3 carbon atoms or nitro groups, $R^2$ and $R^3$ signify alkyl radicals containing 1–3 carbon atoms which taken together with the carbon atom 1 in the indan ring can form a ring, A signifies a possibly lower alkyl substituted ethylene or trimethylene group and $R^4$ and $R^5$ individually signify hydrogen or alkyl radicals containing 1–4 carbon atoms or together with the amine nitrogen form a heterocyclic ring, which in addition to the amine nitrogen may contain an oxygen atom or a possibly lower alkylated imino group.

In those cases where the compounds of formula I may occur as optical antipodes the invention comprises the racemic mixtures as well as each of the components separately. The lower alkyl radicals contain up to 6 carbon atoms, preferably 1–3 carbon atoms, especially the methyl group. The substituent $R^1$ is preferably in 5'-position. When the substituents $R^4$ and $R^5$ together with the amine nitrogen form a heterocyclic ring, the latter is preferably a 5-, 6- or 7-membered ring. Examples of such groups are the pyrrolidino, piperidino and morfolino groups.

An interesting subclass of the new compounds of formula I are, for example, such compounds, in which $R^2$ and $R^3$ both signify methyl or together with the carbon atom 1 of the indan structure form a carbocyclic ring, especially a cyclopentane or a cyclohexane ring. Another interesting subclass of compounds of formula I are those in which $R^1$ signifies halogen, especially chlorine or fluorine.

As examples of interesting compounds of formula I among other things the following may be mentioned:
3'-β-dimethylaminoethyl-oximino-spiro(cyclopentane-1,1'-indan),
3'-β-dimethylaminoethyl-oximino-spiro(cyclohexane-1,1'-indan),
5'-chloro-3'-β-dimethylaminoethyl-oximino-spiro(cyclopentane-1,1'-indan),
5'-fluoro-3'-β-dimethylaminoethyl-oximino-spiro(cyclopentane-1,1'-indan),
3'-β-methylaminoethyl-oximino-spiro(cyclopentane-1,1'-indan),
1,1-dimethyl-3-β-methylaminoethyl-oximino-indan,
and the corresponding amine oxides, quarternary ammonium compounds and salts with physiologically acceptable acids.

The new compounds of formula I are according to the invention prepared in a manner known per se by 1. reacting an indanone oxime of the general formula

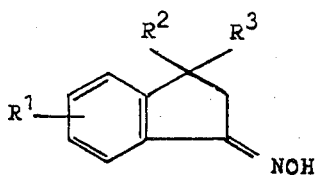

wherein $R^1$, $R^2$ and $R^3$ are as indicated above, with a compound of formula

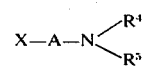

wherein X signifies a reactively esterified hydroxyl group and A, $R^4$ and $R^5$ are as defined above, or 2. by reacting an indanone of the general formula

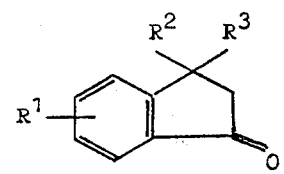

wherein $R^1$, $R^2$ and $R^3$ are as defined above, with a compound of formula

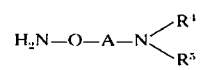

wherein A, $R^4$ and $R^5$ are as defined above, or 3. in a compound of formula

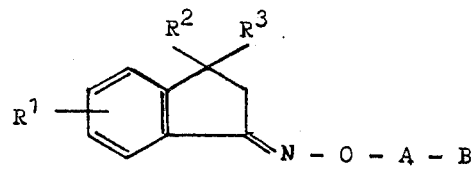

wherein $R^1$, $R^2$, $R^3$ and A are as defined above, and B signifies a group convertible into the above defined group

converting said group B into the group

in a manner known per se.

The reaction (1) is preferably carried out in an inert solvent such as dimethylformamide or acetonitrile, the compound of formula II preferably being used as a salt, e.g. with alkaly metal iones or quarternary ammonium iones. As halogen and arylsulphonyloxy groups are examples of suitable reactively esterified hydroxy groups X.A.

Also the reaction (2) is preferably carried out in an inert solvent such as ethanol or pyridine. In this case the compound of formula VI can either be used as the free base or as a salt with an acid. In the latter case the reaction is carried out in the presence of an acid binding agent such as sodium carbonate or pyridine.

In the method variant (3) the group B convertible into the group

may, for example, be a protected amino group or a hydroxy group which can possibly be reactively esterified, e.g. as a chloride or a bromide. If B is a hydroxy group the conversion into the group

can be carried out by at first esterifying the same with an arylsulphonic acid such as benzene or toluene sulphonic acid, and then the sulphonic acid ester formed is split off with an amine HN

to the compound of formula I. If B is a halogen atom the latter can be replaced directly with the amino group

by treatment with the corresponding amine.

Other examples of suitable groups B, which can be converted into the group

by means of conventional methods, are nitro- or alkoxycarbonylamino groups, and the conversion into compounds of formula I is obtained by reduction or hydrolysis.

The reactions may, of course, also be carried out by firstly preparing a lower alkylated amine derivative, a primary amine or a secondary amine, which may then be alkylated in a conventional manner to the desired secondary or tertiary amine or quarternary ammonium compound. Furthermore, a prepared tertiary amine can also be dealkylated to the corresponding secondary amine.

The formed amines of formula I can, if desired, in a manner known per se be converted to the corresponding salts with physiologically acceptable acids, and the tertiary amines to the corresponding amine oxides.

Starting materials or end products, which are mixtures of optical isomers, may be split into the pure optical antipodes in conventional manner, for example by fractional crystallization of diastereoisomeric salts.

Some of the indanones of formula V used as starting compounds in the process according to the invention are known compounds, whereas others are new. The new compounds can be prepared by means of methods known per se, for example according to the general method described by V. Seidlova and M Protiva [Collection Czechoslovak. Chem. Commun. vol. 32, p. 2832 (1967)] which involves heating the acid chlorides of the corresponding substituted $\beta$-phenylpropionic acids with polyphosphorous acid. Possible halogen, alkoxy or nitrosubstituents $R^1$ can be introduced into said starting compounds by means of methods known per se.

The compound spiro(cyclopentane-1,1'-indan)-3'-one which is used by the preparation of cyclopentane derivatives of formula I and which, as the corresponding halogen, alkoxy and nitrosubstituted derivatives, is a new compound is, however, preferably prepared by another method then the above indicated as the compound 1-phenyl-1-cyclopentane-acetic acid, which is then necessary as an intermediate, is difficult to prepare. The new compound spiro(cyclopentane-1,1'-indan)-3'-one is thus preferably prepared by means of a method described in our copending patent application 343,129 and according to which spiro(cyclopentane-1,1'-indene) is treated with a hydrogen halogenide, preferably hydrogen chloride, and then the 3'-halogen-spiro (cyclopentane-1,1'-indan) compound is oxidized, and then, if desired, a halogen, an alkoxy or a nitro substituent $R^1$ is introduced in a manner known per se. The oxidation is then preferably carried out by means of chromic acid or an acid chromate solution. By means of this method the desired indanone is obtained in high yield.

The hydroxy imines of formula II can be prepared from the corresponding indanones of formula V in a manner known per se, e.g. as described in example I below.

The starting compounds of formula IV can be prepared in analogy with the indicated methods (1) and (2) by using compounds which in place of the group

contain the group B convertible into said group.

The new compounds of formula I according to the invention have in animal tests proved to process valuable pharmacological effects, especially on the central nervous system, which are especially manifasted as an ability to counteract the effect of reserpine, an effect which in pharmacology is used as a measure of the suitability of a compound as a drug against depressions. Certain ones of the substances at the same time show antihistamine effects and/or anticholinergic effect. The compounds all together have low toxicity.

By means of conventional methods and conventional adjurants the compounds can be transformed into suitable pharmaceutical forms of preparations, e.g. tablets or solutions, which, for example, can contain between 1 and 500 mg of the active substance.

In the following table the results of tests concerning antireserpine effect for some specific compounds according to the invention are reported.

All experiments were carried out on albino mice, 18–25 g. The animals had free access to water except during the test period, but were not allowed to eat 4–5 hours before the experiment. The tested substances were administered orally to mice in groups of 6, at 4 dosage levels (12.7; 40; 127 and 400 mg/kg). A control group of 6 mice receiving water was observed simultaneously.

After one hour the mice were injected intraperitoneally with 2,5 mg/kg reserpine, which had been solubilized with a few drops of glacial acetic acid. 0,5; 1; and 2 hours later the treatment with reserpine the ptosis was measured; 0 in score is given for no closure of the eye, 1 for ¼, 2 for ½, 3 for ¾ and 4 for complete closure. The score varies between 0 and 8 for each mouse (the sum of score for each mouse (the sum of score for two eyes). The maximum value for 6 mice is thus 48.

The percentage of antagonism for each compound after 0,5; 1; or 2 hours for each dosage group was obtained by comparison with the score of the simultaneously observed control group. The table indicates the percentage of antagonism after 60 minutes, which is the optimal time for measuring antireserpine effect in this test system.

e. 3'-hydroxyimino-spiro(cyclohexane-1,1'-indan). Mp. 138°–139°C.
f. 1,1-dimethyl-3-hydroxyiminoindan. Oil, Bp. 120°/0.9 mm Hg.
g. 5'-methoxy-3'-hydroxyimino(cyclopentane-1,1'-indan). Mp. 149°C.

Example 2 a. 3'-$\beta$-dimethylaminoethyl-oximino-spiro(cyclopentane-1,1'-indan).

6 g (0.03 moles) of 3'-hydroxyimino-spiro(cyclopentane-1,1'-indan) are added in portions to a solution of 0.77 g (0.033 gram atoms) of sodium in 150 ml of abs. ethanol and then the mixture is refluxed for 1 hour and evaporated in vacuum. To the residue there are added 20 ml of dimethylformamide, of which 10 ml are distilled off in vacuum to remove remaining methanol. Another 80 ml of dimethylformamide are added and then 4.3 g (0.04 moles) of $\beta$-dimethylaminoethylchloride are added dropwise to the mixture at 25°C. Finally the mixture is heated for 1 hour at 100–110°C. The hot solution is filtered off from the sodium chloride formed and evaporated to dryness in vacuum. The residue is taken up in ether and water, the ether phase is washed with water and dried with anhydrous potassium carbonate.

The perchlorate is obtained if the ether solution of the amine is treated with perchloric acid. After

| $R^1$ | $R^2$ | $R^3$ | A | $-N\begin{smallmatrix}R^4\\R^5\end{smallmatrix}$ | Salt | \multicolumn{4}{c}{Antagonism % Dose mg/kg} | | | |
|---|---|---|---|---|---|---|---|---|---|
| | | | | | | 12,7 | 40 | 127 | 400 mg/kg |
| H | $CH_3$ | $CH_3$ | $-CH_2CH_2-$ | $NHCH_3$ | Perchlorate | 32 | 77 | 100 | 100 |
| H | $CH_3$ | $CH_3$ | $-CH_2CH_2-$ | $N(CH_3)_2$ | Hydrochloride | 35 | 53 | 88 | — |
| H | $-(CH_2)_4-$ | | $-CH_2CH_2-$ | $NHCH_3$ | Perchlorate | 21 | 93 | 100 | 100 |
| H | $-(CH_2)_4-$ | | $-CH_2CH_2-$ | $N(CH_3)_2$ | Perchlorate | 22 | 56 | 100 | 100 |
| 5—Cl | $-(CH_2)_4-$ | | $-CH_2CH_2-$ | $N(CH_3)_2$ | Perchlorate | 36 | 43 | 36 | 75 |
| 5—F | $-(CH_2)_4-$ | | $-CH_2CH_2-$ | $N(CH_3)_2$ | Perchlorate | | | | |
| H | $-(CH_2)_5-$ | | $-CH_2CH_2-$ | $N(CH_3)_2$ | Perchlorate | 36 | 43 | 36 | 75 |

The following examples further illustrate the invention. Example 1: Preparation of starting materials a. 3'-hydroxyimino-spiro(cyclopentane-1,1'-indan)
74,5 g (0,4 moles) spiro(cyclopentane-1,1'-indan)-3'-one, 93.6 g hydroxylammonium chloride, 172 ml of pyridine and 440 ml of ethanol are mixed and refluxed for 3 hours. The mixture is evaporated, 500 ml of water are added, and then it is filtered off and dried. The crude oxime obtained is recrystallized from abs. ethanol. Yield 70 g (88%). Colourless crystals melting at 102°C.

In an analogous manner the following oximes were prepared from the corresponding indanones:

b. 5'-nitro-3'-hydroxyimino-spiro(cyclopentane-1,1'-indan). Mp. 162°C.
c. 5'-chloro-3'-hydroxyimino-spiro(cyclopentane-1,1'-indan). Mp. 140°C
d. 5'-fluoro-3'-hydroxyimino-spiro(cyclopentane-1,1'-indan). Mp. 156°C.

recrystallization from 2-propanol the salt melts at 136°–139°C.

In an analogous manner the following substances are prepared from the corresponding oximes and aminoalkyl chloride: b. 3'-$\gamma$-dimethylaminopropyl-oximino-spiro(cyclopentane-1,1'-indan). Hydrochloride, mp. 186°–187°C.

c. 3'-$\beta$-dimethylaminoethyl-oximino-spiro(cyclohexane-1,1'-indan). Hydrochloride, mp. 109°–112°C.
d. 3'-$\gamma$-dimethylaminopropyl-oximino-spiro(cyclohexane-1,1'-indan). mp. 184°C.
e. 3'-$\gamma$-piperidinopropyl-oximino-spiro(cyclohexane-1,1'-indan). Hydrochloride. mp. 176°C
f. 3'-$\beta$-(1-pyrrolidinyl)ethyl-oximino-spiro(cyclohexane-1,1'-indan). Hydrochloride, mp. 162°C.
g. 3'-$\beta$-morfolinoethyl-oximino-spiro(cyclohexane-1,1'-indan Hydrochloride, mp. 184°C.
h. 3'-$\beta$-diethylaminoethyl-oximino-spiro(cyclohexane-1,1'-indan). Hydrochloride, mp. 191°C.

i. 3'-γ-diethylaminopropyl-oximino-spiro(cyclohexane-1,1'-indan). Hydrochloride, mp. 156°C.
j. 1,1-dimethyl-3-β-diethylaminoethyl-oximino-indan. Hydrochloride, mp. 138°C.
k. 1,1-dimethyl-3-γ-dimethylaminopropyl-oximino-indan. Hydrochloride, mp. 162°C.
l. 1,1-dimethyl-3-γ-piperidinopropyl-oximino-indan. Fumarate mp. 138°C.
m. 1,1-dimethyl-3-β-(1-pyrrolidinyl)ethyl-oximino-indan. Hydrochloride, mp. 157°C.

Example 3 a. 5'-chloro-3'-β-dimethylaminoethyl-oximino-spiro(cyclopentane-1,1'-indan).

5.9 g (0.025 moles) of 5'-chloro-3'-hydroxyimino-spiro-(cyclopentane-1,1'-indan) are dissolved in 150 ml of dimethyl-formamide under agitation at room temperature. 2.9 g (0.066 moles) of 55% sodium hydride (dispersed in oil) are added in portions and then the mixture is stirred for 10 minutes at room temperature. 5.1 g (0.035 moles) of dimethylaminoethylchloride-hydrochloride are added in portions to the mixture which is then stirred for another 10 minutes at room temperature and finally for two hours at 100°–105°C. The sodium chloride formed is filtered off from the hot solution which is then evaporated. The residue is taken up in ether and water, the ether solution is washed with water and then the amine is extracted out with 2 N hydrochloric acid. The acid extract is washed with ether and made alkaline with 40% sodium hydroxide. The free amine is extracted out with ether and dried with anhydrous potassium carbonate.

The perchlorate is obtained if the ether solution of the amine is treated with perchloric acid. After recrystallization from 2-propanol the salt melts at 134°C.

In an analogous manner there is prepared:
b. 5'-fluoro-3'-β-dimethylaminoethyl-oximino-spiro(cyclopentane-1,1'-indan). Perchlorate, mp. 172°C.

Example 4 a. 3'-β-methylaminoethyl-oximino-spiro(cyclopentane-1,1'-indan)

To a solution of 3'-β-dimethylaminoethyl-oximino-spiro-(cyclopentane-1,1'-indan) (33.5 g; 0,11 moles) in dry benzene (120 ml there are added dropwise during 20 minutes a solution of ethylchloroformiate (24 g; 0.22 moles), and then the mixture is boiled for 2 hours, cooled, washed with 2 N hydrochloric acid and dried with anhydrous magnesium sulfate. After evaporation there is obtained 3'-β-(N-carboxy-N-methyl-amino)ethyl-oximino-spiro(cyclopentane-1,1'-indan) as a yellow oil (32.7 g) which is used for hydrolysis without any particular purification.

3'-β-(N-carbetoxy-N-methylamino)ethyl-oximino-spiro (cyclopentane-1,1'-indan) (5 g; 0.015 moles), sodium hydroxide (20 g), water (15 ml) and methanol (15 ml) are mixed and refluxed for 48 hours and then the methanol is eliminated in vacuum. The alkaline solution is extracted with ether. The ether extract is shaken with 2 N hydrochloric acid and then the acid solution is made alkaline with 40% sodium hydroxide and extracted with ether. After drying and evaporation the free amine 3'-β-methylaminoethyl-oximino-spiro-(cyclopentane-1,1'-indan) is obtained as a pale oil (2.8 g).

The perchlorate is obtained if the dry ether solution of the amine is treated with perchloric acid. After recrystallization from 2-propanol the salt melts at 100°C.

In an analogous manner there is prepared via the oily intermediate 3'-β-(N-carbetoxy-N-methylamino)-ethyl-oximino-spiro(cyclohexane-1,1'-indan).
b. 3'-β-methylaminoethyl-oximino-spiro(cyclohexane-1,1'-indan). Hydrochloride, mp. 155°C. and via the intermediate 1,1'-dimethyl-3-β-(N-carbetoxy-N-methylamino)-ethyloximino-indan (oil) there is prepared
c. 1,1'-dimethyl-3-β-methylaminoethyl-oximino-indan. Perchlorate, mp. 135°C.

Example 5 a. 3'-β-trimethylammoniumethyl-oximino-spiro(cyclohexane-1,1'-indan) methylsulphate 3'-β-dimethylaminoethyl-oximino-spiro(cyclohexane-1,1'-indan) (8.4 g; 0.03 moles) in methanol (50 ml) there is added dimethylsulphate (9 ml) under shaking. After about 5 minutes 450 ml ether are added and crystals of the trimethylammonium compound precipitate (6,8 g; 55%).

After recrystallization from 2-propanol/isopropylether the salt melts at 160°C.

In an analogous manner the following quarternary amine salts are prepared from the corresponding tertiary amines:
b. 3'-β-(N,N-diethyl-N-methylammonium)ethyl-oximinospirocyclohexane-1,1'-indan)methylsulphate. Mp. 122°C.
c. 3'-β-(N-methyl-1-pyrrolidinium)ethyl-oximino-spiro (cyclohexane-1,1'-indan)methylsulphate. Mp. 153°C.

Example 6

3'-β-dimethylaminoethyl-oximino-spiro(cyclohexane-1,1'-indan)β-N-oxide hemi hydrate.

3'-β-dimethylaminoethyl-oximino-spiro(cyclohexane-1,1'-indan) (2.9 g; 0.026 moles), 30% hydrogen peroxide solution (2.9 g; 0.026 moles) and methanol (11 ml) are mixed and kept at room temperature for some days. After evaporation in vacuum there is obtained a glassy mass which crystallizes slowly. The crystalline product is triturated with isopropyl ether and filtered off. Yield 6.5 (80%) of a colourless product of mp. 44°C.

Example 7

3'-γ-dimethylaminopropyl-oximino-spiro(cyclopentane-1,1'-indan)

3'-hydroxyimino-spiro(cyclopentane-1,1'-indan) (20,1 g; 0.1 moles) in 150 ml of dimethylformamide is converted into the sodium salt by stirring with sodium hydride (4.8 g; 0.1 moles, 50% in paraffin oil). 1,3-dibromopropane (200 g; 1 mole) is added and then the mixture is heated at 100°C for 14 hours. The excess of dibromopropane and the solvent is distilled off i vakuum and the evaporation residue is taken up in ether and water. The ether solution is dried with sodium sulphate and evaporated. 3'-γ-bromopropyl-oximino-spiro (cyclopentane-1,1'-indan) is obtained as an oil. This oil is dissolved in 200 ml of methanol containing 45 g (1 mole) of dimethylamine. The solution is kept in a closed container at room temperature for 14 days and evaporated. The evaporation residue is taken up in ether and water. The ether phase is shaken out with 2 N hydrochloride acid, the hydrochloric acid phase washed with ether and made alkaline with 40 % sodium hydroxide and then the freed amine is extracted out with ether. The extract is dried and the hydrochloride of the amine is precipitated with a solution of hydrogen chloride in ether. After recrystallization from 2-propanol there is obtained a colourless product of mp. 186°–187°C, which is identical with the product prepared according to example 2b.

Example 8

3′-β-dimethylaminoethyl-oximino-spiro(cyclopentane-1,1′-indan)

A solution of β-dimethylaminoethoxyamine (F. Winternitz and R. Lachazette, Bull. Soc. Chim. France, 1958, 664) (10.5 g; 0.1 mole) and spiro(cyclopentane-1,1′-indan)-3′-one (18.6 g; 0.1 mole) in 100 ml of methanol and refluxed for 4 hours. The solution is evaporated in vacuum and the residue is taken up in ether. The ether solution is extracted out with 2 N hydrochloric acid. The combined acid extracts are washed with ether and made alkaline with 40% sodium hydroxide solution and then the freed amine is shaken out with ether. After drying with potassium carbonate the perchlorate is precipitated by the addition of perchloric acid to the ether solution. The salt is filtered off and crystallized from 2-propanol, and then the product melts at 136°–138°C. The product is identical with the product prepared according to example 2a.

What we claim is:

1. Pharmacodynamically active amino alkyloxime ethers of the general formula

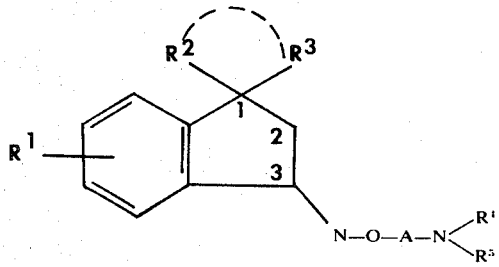

wherein $R^1$ signifies hydrogen, halogen, alkoxy radicals containing 1–3 carbon atoms or nitro groups; $R^2$ and $R^3$ signify an alkylene radical which taken together with the carbon atom 1 in the indan ring contains 3–7 carbon atoms; A signifies an ethylene or trimethylene group which may be substituted with a lower alkyl group; and $R^4$ and $R^5$ individually signify hydrogen or alkyl radicals containing 1–4 carbon atoms, and lower alkyl quarternary ammonium salts, amine oxides and physiologically acceptable acid salts of such compounds.

2. 3′-β-dimethylaminoethyl-oximino-spiro(cyclopentane-1,1′-indan).

3. 3′-β-dimethylaminoethyl-oximino-spiro(cyclohexane-1,1′-indan).

4. 5′-chloro-3′-β-dimethylaminoethyl-oximino-spiro(cyclopentane-1,1′-indan).

5. 5′-fluoro-3′-β-dimethylaminoethyl-oximino-spiro(cyclopentane-1,1′-indan).

6. 3′-β-methylaminoethyl-oximino-spiro(cyclopentane-1,1′-indan).

7. A compound according to claim 1, wherein $R^2$ and $R^3$ together form a cyclopentane or cyclohexane ring.

8. A compound according to claim 1, wherein $R^1$ signifies halogen.

9. A compound according to claim 8, wherein the halogen is chlorine or fluorine.

* * * * *

UNITED STATES PATENT AND TRADEMARK OFFICE
CERTIFICATE OF CORRECTION

PATENT NO. : 3,903,164

DATED : September 2, 1975

INVENTOR(S) : Barbro Karin Göransson-Dahlander et al.

It is certified that error appears in the above-identified patent and that said Letters Patent are hereby corrected as shown below:

Change the title to -- PHARMACODYNAMICALLY ACTIVE AMINO ALKYLOXIME ETHERS --.

In the Abstract, first line, delete "alkyloxim" and substitute therefor -- alkyloxime --;

fifth line from the end, delete "quarternary" and substitute therefor -- quaternary --;

Column 1, line 2, delete "ALKYLOXIM" and substitute therefor -- ALKYLOXIME --;

line 5, delete "alkyloxim" and substitute therefor -- alkyloxime --;

line 21, delete "amineoxides" and substitute therefor -- amine oxides --;

lines 45 and 46, delete "morfolino" and substitute therefor -- morpholino --;

Column 2, line 1, delete "quarternary" and substitute therefor -- quaternary --;

Column 3, line 4, delete "alkaly metal iones or quarternary" and substitute therefor -- alkali metal ions or quaternary --;

line 5, delete "iones" and substitute therefor -- ions --;

UNITED STATES PATENT AND TRADEMARK OFFICE
CERTIFICATE OF CORRECTION

PATENT NO. : 3,903,164
DATED : September 2, 1975
INVENTOR(S) : Barbro Karin Göransson-Dahlander et al.

It is certified that error appears in the above-identified patent and that said Letters Patent are hereby corrected as shown below:

line 64, delete "quarternary" and substitute therefor -- quaternary --;

Column 4, line 6, delete "isomeres" and substitute therefor -- isomers --;

line 60, delete "manifasted" and substitute therefor -- manifested --;

last line, delete "adjurants" and substitute therefor -- adjuvants --;

Column 6, line 64, delete "3'-β-morfolinoethyloximino-spiro(cyclohexane-" and substitute therefor -- 3'-β-morpholino-ethyl-oximino-spiro(cyclohexane- --;

Column 8, line 22, delete "quarternary" and substitute therefor -- quaternary --;

line 41, delete "colourless" and substitute therefor -- colorless --;

line 53, delete "i" and substitute therefor -- in --;

line 54, delete "vakuum" and substitute therefor -- vacuum --;

Column 9, line 1, delete "colourless" and substitute therefor -- colorless --;

UNITED STATES PATENT AND TRADEMARK OFFICE
CERTIFICATE OF CORRECTION

PATENT NO. : 3,903,164
DATED : September 2, 1975
INVENTOR(S) : Barbro Karin Göransson-Dahlander et al.

It is certified that error appears in the above-identified patent and that said Letters Patent are hereby corrected as shown below:

Claim 1, lines 26-36:

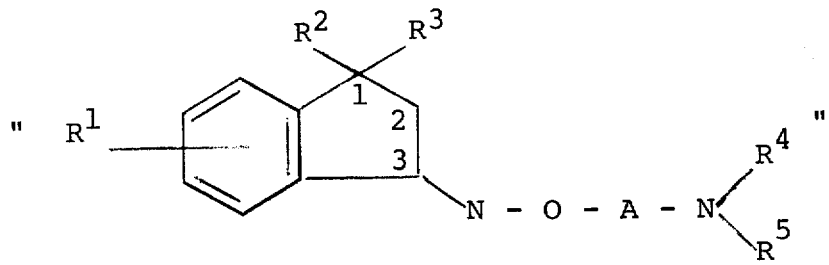

should be,

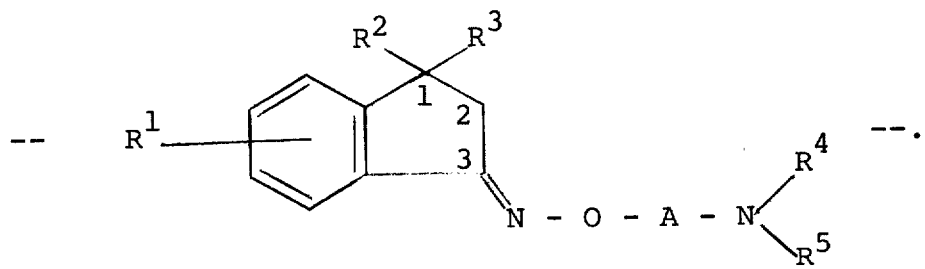

Column 10, claim 1, line 9, delete "quarternary" and substitute therefor -- quaternary --.

Signed and Sealed this sixth Day of April 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,903,164
DATED : September 2, 1975
INVENTOR(S) : Barbro Karin Göransson-Dahlander et al.

It is certified that error appears in the above-identified patent and that said Letters Patent are hereby corrected as shown below:

Column 7, delete line 3 and substitute therefor

-- j. 1,1-dimethyl-3-β-dimethylaminoethyl-oximino- --.

Signed and Sealed this

Tenth Day of August 1976

[SEAL]

Attest:

RUTH C. MASON
Attesting Officer

C. MARSHALL DANN
Commissioner of Patents and Trademarks